United States Patent
Feigl et al.

(10) Patent No.: US 7,173,759 B2
(45) Date of Patent: Feb. 6, 2007

(54) MONOCHROMATOR MIRROR FOR THE EUV-SPECTRAL RANGE

(75) Inventors: Torsten Feigl, Jena (DE); Norbert Kaiser, Jena (DE); Thomas Kuhlmann, Jena (DE); Sergey Yulin, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 252 days.

(21) Appl. No.: 10/505,550

(22) PCT Filed: Feb. 21, 2003

(86) PCT No.: PCT/EP03/01842

§ 371 (c)(1),
(2), (4) Date: Aug. 23, 2004

(87) PCT Pub. No.: WO03/071317

PCT Pub. Date: Aug. 28, 2003

(65) Prior Publication Data

US 2005/0128571 A1 Jun. 16, 2005

(30) Foreign Application Priority Data

Feb. 25, 2002 (DE) ............................. 102 08 705

(51) Int. Cl.
*G02B 5/08* (2006.01)
(52) U.S. Cl. ........................... 359/359; 359/584
(58) Field of Classification Search ............ 359/359, 359/360, 580, 584–589
See application file for complete search history.

(56) References Cited

U.S. PATENT DOCUMENTS

| | | | |
|---|---|---|---|
| 6,110,607 A * | 8/2000 | Montcalm et al. | 428/641 |
| 6,160,867 A * | 12/2000 | Murakami | 378/84 |
| 6,441,963 B2 * | 8/2002 | Murakami et al. | 359/584 |
| 6,449,086 B1 * | 9/2002 | Singh | 359/361 |
| 6,521,101 B1 * | 2/2003 | Skulina et al. | 204/192.27 |
| 2002/0171922 A1 * | 11/2002 | Shiraishi et al. | 359/359 |
| 2003/0147139 A1 * | 8/2003 | Kandaka et al. | 359/584 |
| 2004/0233519 A1 * | 11/2004 | Bijkerk et al. | 359/359 |

FOREIGN PATENT DOCUMENTS

EP 1 065 532 A2 1/2001

OTHER PUBLICATIONS

Attwood, Multilayer Interference Coating.
Underwood, et al., Layered synthetic microstructures as Bragg diffractors for x-rays and extreme ultraviolet: theory and predicted performance, Applied Optics, vol. 20, No. 17, Sep. 1981.

(Continued)

*Primary Examiner*—Mark A. Robinson
*Assistant Examiner*—Mark Consilvio
(74) *Attorney, Agent, or Firm*—Marshall & Melhorn LLC

(57) ABSTRACT

The invention relates to a monochromator mirror for the EUV-spectral range, provided with a layer arrangement placed on a substrate, comprising a periodic sequence of two individual layers (A, B) made of different material forming a period having a thickness d in the form of a spacer-layer or an absorber-layer, whereby the reflectivity of the second or a higher Bragg-order is used. Said thickness d has a dimensional deviation of a maximum of 3% and the ratio of the layer thickness of the absorber-layer to the period thickness is smaller than the ratio of 0.8 of the used order of the Bragg-Reflexion.

5 Claims, 2 Drawing Sheets

OTHER PUBLICATIONS

Benbalagh, et al., Fabrication and characterization of a Mo/Si multilayer monochromator with a narrow spectral bandwidth in the xuv domain; Nuclear Instruments and Methods in Physics Research A 458 (2001) 650-655.

Lim, et al., Fabrication and characterization of EUV multilayer mirrors optimized for small spectral reflection bandwidth; Applied Physics 72, 121-124 (2001).

* cited by examiner

MONOCHROMATOR MIRROR FOR THE EUV-SPECTRAL RANGE

BACKGROUND OF THE INVENTION

The invention relates to a mirror for the EUV spectral range, which guarantees monochromatisation of EUV radiation.

Optical systems in the EUV spectral range, which extends from about 5 nm to 40 nm, are based on multi-layer mirrors. They consist of alternating layer systems of two materials, which differ as much as possible in their optical constants. For some applications of EUV radiation, for example in the field of materials research, X-ray astronomy or the development of X-ray microscopes, monochromatisation of EUV radiation is necessary. For this, it is necessary to reduce the half width of the reflection of multi-layer mirrors.

Two approaches are known in the literature for this reduction of the half width:

It is known to carry out lateral structuring by reactive ion etching for a multi-layer mirror of the material combination molybdenum/silicon from R. Benbalagh, J. M. Andre, R. Barchewitz, M. F. Ravet, A. Raynal, F. Delmotte, F. Nridou, G. Julie, A. Bosseboeuf, R. Laval, P. Troussel, Nucl. Inst. Meth. Phy. Res. A 458(3) (2001), 650–655, and hence to achieve a reduction of the half width of the reflection of the multi-layer mirror by a factor 3 with respect to the full half width of the reflection of a molybdenum/silicon multi-layer mirror optimised for maximum reflectivity.

However, this process has the disadvantages that the lithographic structuring of the multi-layer is very expensive and also that for such a multi-layer mirror, a considerable reduction of the reflectivity to R=2% can be observed for an angle of incidence of about 45°—compared to this, a corresponding multi-layer mirror not lithographically structured in this manner has a reflectivity of R=40% for the same angle of incidence.

It is known to achieve a reduction of the half width of the reflection of molybdenum/silicon multi-layer mirrors by a reduction of the layer thickness of the molybdenum part layers from Y. C. Lim, T. Westerwalbesloh, A. Aschentrup, O. Wehmeyer, G. Haindl, U. Kleineberg, U. Heinzmann, Appl. Phys. A72 (2001), 121–124. However, in practice it is shown that a reduction of the molybdenum layer thickness is only possible to a limited extent, since it is only about 3 nm even for a standard multi-layer mirror.

SUMMARY OF THE INVENTION

It is the object of the present invention to indicate a multi-layer mirror which has a low half width of its reflection in the EUV spectral range and has high reflectivity in a wide range of angles of incidence. The limitations and disadvantages of the said state of the art should also be avoided.

This object is by a monochromator mirror for the EUV spectral range having a layer arrangement applied to a substrate and which has a sequence of individual layers.

Due to the fact that the layer arrangement has a periodic sequence of in each case two individual layers A and B of different materials forming one period with the period thickness d and having the particular layer thickness $d_A$ and $d_B$, so that the following applies:

$$0.97(d_A+d_B) \leq d \leq (d_A+d_B)1.03 \text{ where}$$

$$(n_A d_A + n_B d_B)*\cos(\theta) = m*\lambda/2,$$

wherein $n_A$ and $n_B$ are the real parts of the complex refractive indices of the materials of the individual layers A and B, m is a whole number representing the order of Bragg reflection greater than or equal to 2 and λ is the wavelength of the incident radiation and θ is the angle of incidence of the incident radiation, a significant reduction of the half width of the reflection of the mirror of the invention is achieved, in that this multi-layer mirror thus produced is used in the $2^{nd}$ or higher order of Bragg reflection. The multi-layer mirror acts as a monochromator due to this reduction of the half width based on Bragg reflection of higher order—as a result of which the structure of the optical systems in the EUV spectral range is considerably simplified, for example of synchrotron radiation sources and in EUV spectrometers of plasma sources, in which various types of gratings are conventionally used for monochromatisation of EUV radiation, since the multi-layer mirror can be used at the same time as a monochromator and as a beam-guiding element. Extension of the beam path by an additional grating is no longer necessary.

The required effect is thus also achieved for the general case of inclined wave incidence by taking into account the angle of incidence θ.

As can be seen from the condition of the main claim, multiplication of the period thickness is necessary for achieving the reflectivity of a higher Bragg order, which usually leads to a reduction of the reflectivity of the multi-layer mirror.

This reduction of the reflectivity when multiplying the period thickness is limited according to the invention in that for the afore-mentioned multiplication, only the thickness of the individual layer B (spacer layer) is increased, whereas the thickness of the individual layer A (absorber layer) remains the same compared to a corresponding multi-layer mirror, which uses a Bragg reflection of the first order, that is in that the layer thickness ratio $\Gamma = d_A/d$ is always smaller than 0.8/m, wherein m is a whole number representing the order of Bragg reflection greater than or equal to 2.

In an advantageous development according to claim 2, even better results may be achieved if for the layer thickness ratio Γ, it applies that it is always smaller than 0.5/m.

One exemplary embodiment of the invention is shown in FIG. 1 below; the invention is illustrated clearly using this figure.

DESCRIPTION OF THE PREFERRED EMBODIMENTS

Figure 1:
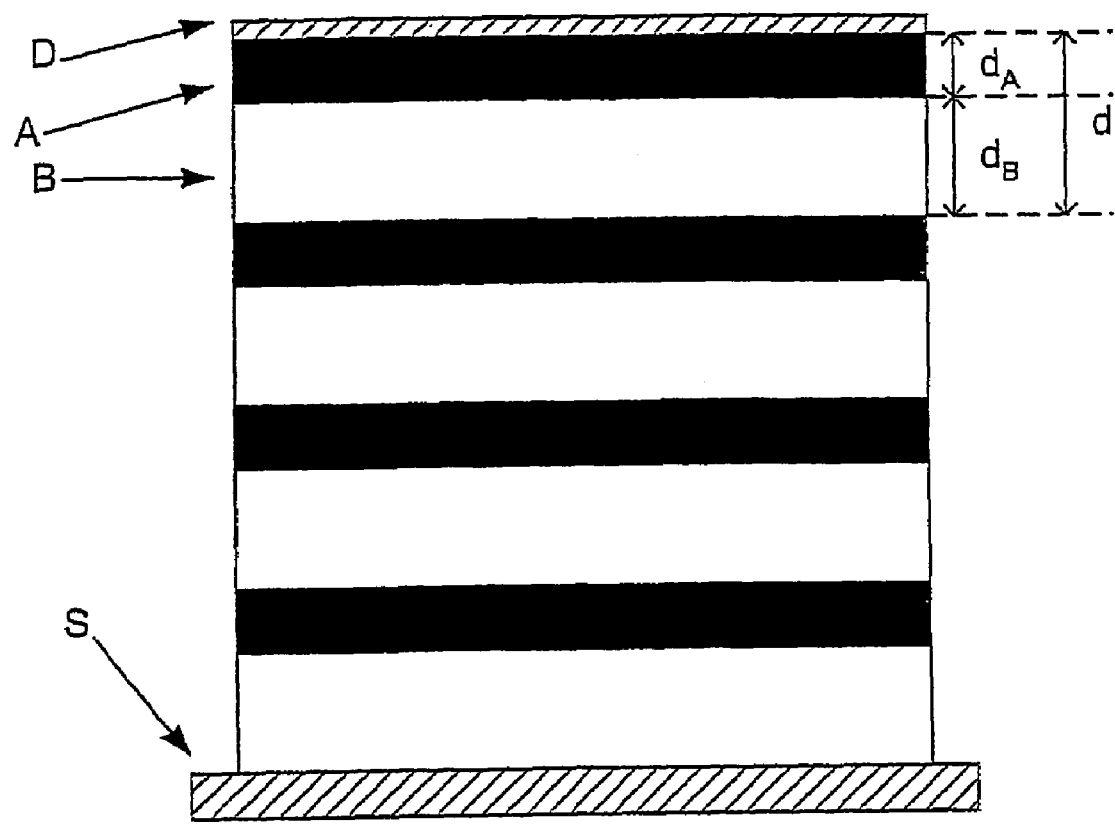
FIG. 1 shows a schematic cross-section through a monochromator multi-layer mirror.

FIG. 1 shows by way of example schematically, the layer structure of a multi-layer monochromator mirror for the EUV spectral range. Individual layers A and B, which in each case together form one period, and wherein the particular layer A shown in black represents the absorber layer having the thickness $d_A$ and the particular layer B shown in white represents the spacer layer having the thickness $d_B$, are situated in periodic sequence below a cover layer D, which consists for example of silicon. The period thickness d is produced from the sum of the layer thicknesses $d_A$ and $d_B$.

Four such periods consisting of layers A and B are shown schematically in the drawing, wherein the lowermost layer forms a boundary surface with the substrate S. The layer thicknesses $d_A$ and $d_B$ are in each case the same in all periods, so that the particular period thickness d overall has a dimensional deviation of ±1% at the most and thus this possible manufacture-related dimensional deviation nevertheless guarantees the ability to function of the invention.

In a practical design, the absorber layer A consists, for example of molybdenum and the spacer layer B, for example of silicon. The substrate S is designed here as a silicon wafer. The number of periods consisting of layers A and B is, for example 40, so that the penetration depth of radiation is utilised to the maximum extent.

The multi-layer monochromator mirror shown schematically in FIG. 1 uses the second or a higher order of Bragg reflection. The layer thickness d of any of the periods here is the ideal value $d=d_A+d_B$ where $n_A d_A + n_B d_B = m*\lambda/2$, wherein the complex refractive indices of the materials of the individual layers A and B are given by $\acute{n}_A = n_A + ik_A$ and $\acute{n}_B = n_B + ik_B$, so that $n_A$ and $n_B$ are produced directly from the real parts of the complex refractive indices, and wherein also m is a whole number representing the order of Bragg reflection greater than or equal to 2 and $\lambda$ the wavelength of the incident radiation which is to be reflected as undamped as possible by the monochromator mirror.

In order to multiply the period thickness with respect to a usual multi-layer mirror having a reflection of the first Bragg order, so that the reflection of the second or higher Bragg order is achieved and the reduction of the half width associated therewith, as has been formulated in the above formula expression, but to thus keep the reflectivity of the mirror as far as possible in the reflection maximum, only the thickness of the spacer layer B is increased to multiply the period thickness, whereas the thickness of the absorber layer A is not changed compared to the afore-mentioned multi-layer mirror of the first order. The layer thickness ratio $\Gamma = d_A/d$ is thus selected in each period so that $$\Gamma < 0.8/m$$

is fulfilled. Even better results may be achieved by the selection of $\Gamma < 0.5/m$.

Since the spacer material in a multi-layer mirror is selected so that it only has a very low absorption, the reflectivity is reduced in this manner by far not so strongly as when both layer thicknesses would have been increased in the same ratio, in order to achieve the reflection in a higher order with respect to a multi-layer mirror of the first order.

In a simulation, which had as its base such a multi-layer monochromator mirror with molybdenum as absorber layer and silicon as spacer layer with 50 periods and a selected wavelength of 13.5 nm, and in which roughness and inter-diffusion layers at the molybdenum/silicon boundary surfaces have been ignored, the maximum reflectivity which can be achieved theoretically using the arrangement described and the full half width of the peak (FWHM—Full Width At Half Maximum) are produced via the various Bragg orders m and the layer thicknesses of the spacer layers B resulting therefrom, as in Table 1. Even in the second Bragg order, a reduction of the half width by for example a factor of 2 can be achieved. Even in the tenth Bragg order, a reflectivity of more than 25% can still be achieved.

TABLE 1

| M | $d_{Si}$ (nm) | $d_{Mo}$ (nm) | Period d (nm) | $\Gamma$ | $R_{max}$ (%@13.5 nm) | FWHM (nm) |
|---|---|---|---|---|---|---|
| 1 | 3.92 | 3.00 | 6.92 | 0.43 | 75.6 | 0.631 |
| 2 | 10.7 | 3.00 | 13.7 | 0.22 | 65.7 | 0.327 |
| 3 | 17.5 | 3.00 | 20.5 | 0.17 | 57.4 | 0.220 |
| 5 | 31.0 | 3.00 | 34.0 | 0.096 | 44.4 | 0.137 |
| 10 | 64.8 | 3.00 | 67.8 | 0.046 | 25.2 | 0.080 |

Figure 2:
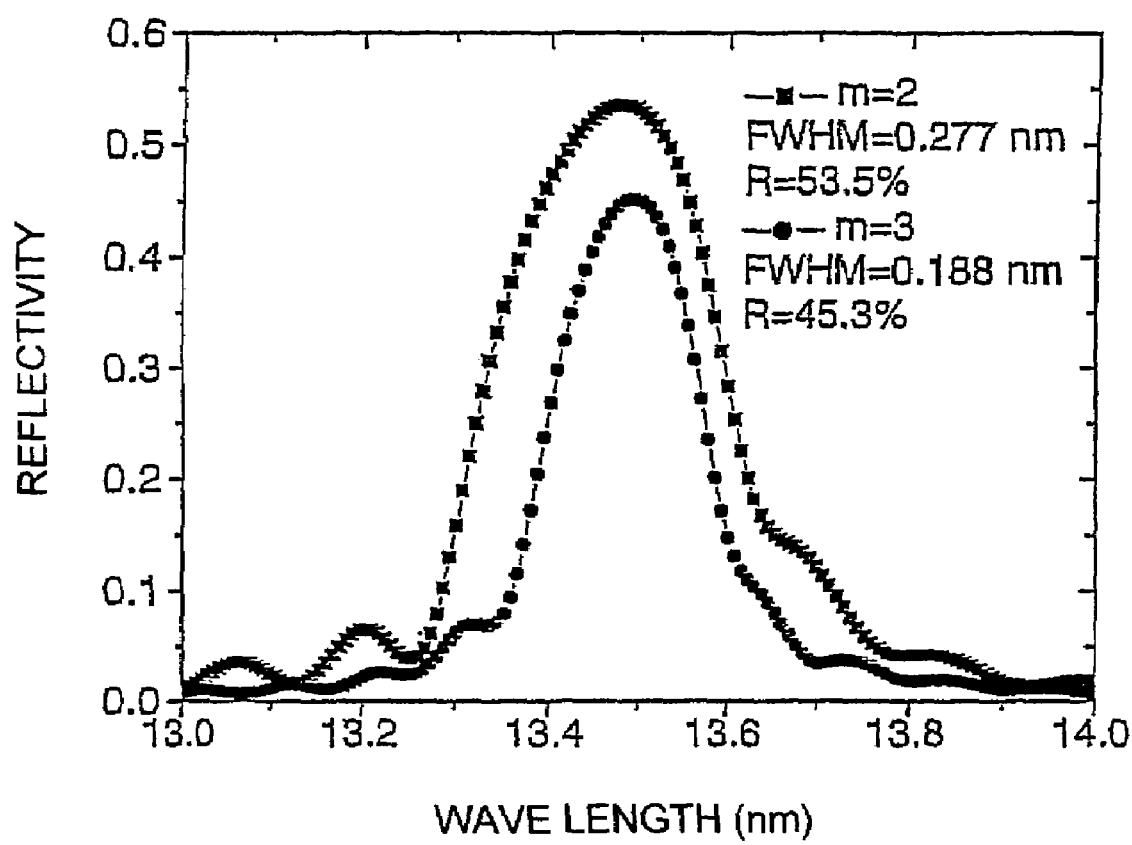
FIG. 2 shows a diagram with experimentally measured reflection values.

In a practical realisation of such a multi-layer monochromator mirror for the reflections in the second or third Bragg order and having a layer design, as corresponds to the values indicated in Table 1 for m=2 and m=3, the reflectivity values of these layer systems shown in the diagram in FIG. 2 could be measured in the EUV range as a function of the wavelength. It can be seen clearly how a narrow maximum reflectivity is achieved around the selected wavelength $\lambda$ of 13.5 nm and hence the required monochromatisation around the required wavelength $\lambda$.

The full half width of reflectivity is 0.277 nm here for the Bragg order m=2 at a maximum reflectivity of R=53.5% and 0.188 m for m=3 at a maximum reflectivity of R=45.3%. With respect to a traditional multi-layer mirror having a Bragg reflection of the first order, the half width was thus reduced to less than half, or to less than one third.

The invention claimed is:

1. A monochromator mirror for the EUV spectral range having a layer arrangement applied to a substrate and which has a sequence of individual layers, wherein the layer arrangement has a periodic sequence of two individual layers A and B of different materials forming one period with the period thickness d and having the particular layer thickness $d_A$ and $d_B$, so that the following applies:

$$0.97(d_A+d_B) \leq d \leq (d_A+d_B)1.03 \text{ where}$$

$$(n_A d_A + n_B d_B)*\cos(\theta) = m*\lambda/2,$$

wherein $n_A$ and $n_B$ are the real parts of the complex refractive indices of the materials of the individual layers A and B, m is a whole number representing the order of Bragg reflection greater than or equal to 2 and $\lambda$ is the wavelength of the incident radiation and $\theta$ is the angle of incidence of the incident radiation, and wherein also the following applies for the layer thickness ratio $\Gamma = d_A/d$:

$$\Gamma < 0.8/m;$$

and wherein the reduction of the half width of mirror reflection when using a Bragg reflection of the $2^{nd}$ order (m=2) with respect to the half width of the mirror reflection when using a Bragg reflection of the $1^{st}$ order (m=1) is about the factor 2.

2. The monochromator mirror according to claim 1, wherein the following applies for the layer thickness ratio $\Gamma = d_A/d$:

$$\Gamma < 0.5/m.$$

3. The monochromator mirror according to claim 1, wherein the materials of the individual layers A and B are molybdenum and silicon.

4. The monochromator mirror according to claim 1, wherein it has so many periods that the penetration depth of the incident radiation is utilized to the maximum extent for achieving optimum reflectivity.

5. The monochromator mirror according to claim 1, wherein a cover layer is provided on the surface of the layer lying remote from the substrate.

* * * * *